United States Patent

Glegg et al.

[15] 3,670,329

[45] June 13, 1972

[54] METHOD OF MEASURING AIRCRAFT PARAMETERS USING DOPPLER TECHNIQUES AND ALTITUDE HOLES

[72] Inventors: Keith C. M. Glegg, Montreal, Quebec; John F. Haberl, Pointe Claire, Quebec; Hans W. Baumans, Montreal, Quebec; Rein Piibe, Dollard des Ormeaux, Quebec, all of Canada

[73] Assignee: Canadian Marconi Company, Montreal, Quebec, Canada

[22] Filed: Oct. 5, 1970

[21] Appl. No.: 77,803

[52] U.S. Cl. ...................................343/9, 343/8, 343/12 A
[51] Int. Cl. ..................................................G01s 9/46
[58] Field of Search ............................343/8, 9, 12 R, 12 A

[56] References Cited

UNITED STATES PATENTS 2,896,205  7/1959  Berger ..................................343/8 X Primary Examiner—T. H. Tubbesing
Attorney—Fetherstonhaugh & Co.

[57] ABSTRACT

In FM/CW airborne radar systems, the presence of altitude holes at multiples of half the wavelength of the modulating frequency has presented problems in that these altitude holes represent "blind" spots. In accordance with the invention, it has been discovered that these altitude holes can be used to advantage by detecting the Doppler shifts associated with several altitude holes and using the data thus obtained to solve a like number of simultaneous equations, and to thereby obtain aircraft flight parameters. The disclosure treats of the theory behind the invention and describes, in general terms, a system for detecting altitude holes and the Doppler shifts associated therewith.

4 Claims, 4 Drawing Figures

INVENTORS
K. C. M. GLEGG
J. F. HABERL
H. W. BAUMANS
R. PIIBE

*Fetherstonhaugh & Co.*
PATENT AGENTS

METHOD OF MEASURING AIRCRAFT PARAMETERS USING DOPPLER TECHNIQUES AND ALTITUDE HOLES

This invention relates to a method and system for measuring aircraft flight parameters. More specifically, this invention relates to a method and system of measuring the above parameters by detecting Doppler shift frequencies associated with altitude holes, in an airborne FM/CW radar system, and using the information thus obtained to compute the flight parameters.

In present FM/CW Doppler systems, the presence of altitude holes is undesirable and many methods have been devised to eliminate the effect of altitude holes. However, applicants have discovered that the presence of these altitude holes can be advantageously employed to provide a lightweight and inexpensive aircraft flight parameter measuring system.

The Doppler effect is a well known phenomenon by means of which the frequency of a signal transmitted from a moving craft is shifted in proportion to the velocity of the craft. Another well known phenomenon is the fact that, in an FM/CW system altitude holes (substantially zero reflected power) appear at multiples of the half wavelengths of the modulating frequency. The instant invention utilizes the Doppler effect by detecting the Doppler shift frequencies at which altitude holes occur.

The invention will be described below together with the accompanying drawings in which.

Figure 1:
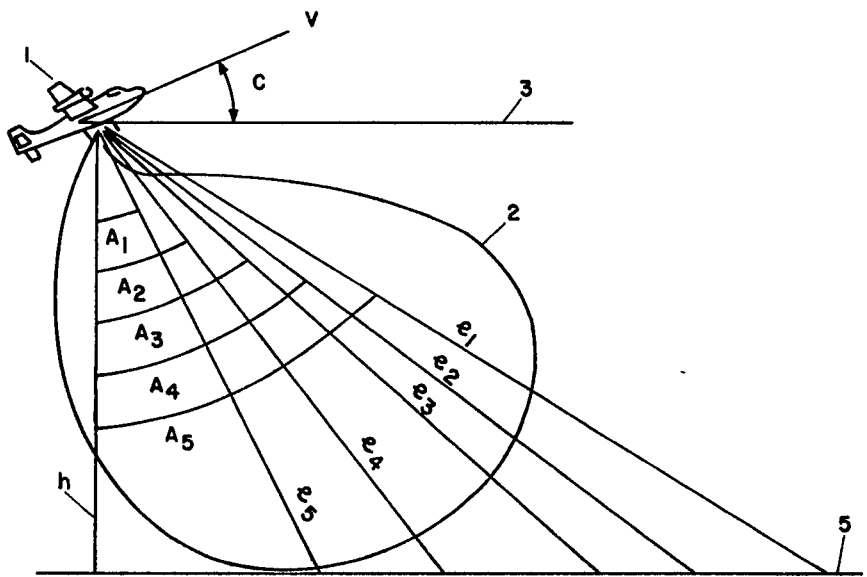
FIGS. 1 and 2 are illustrations useful in explaining the theory of the invention.

In FIG. 1, 1 is an aircraft using an antenna having a fan shaped beam 2 of narrow width and transmitting a signal at a carrier frequency $f_c$, frequency modulated by a signal having a wavelength $W_m$. The aircraft is flying with a velocity V at an angle C to the horizontal 3. $l_1$ to $l_5$ are lines whose lengths are multiples of $W_{m/2}$ and $A_1$ to $A_5$ are the angles between the vertical $h$ and the lines $l_1$ to $l_5$ respectively.

Figure 2:
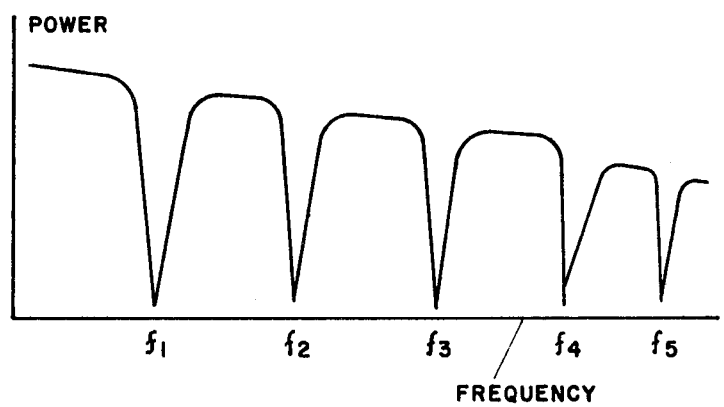

FIG. 2 illustrates the frequency response to an FM/CW wave transmitted with the antenna illustrated in FIG. 1. The drop in power is, of course, due to an increase in distance. $f_1$ to $f_5$ are the Doppler shift frequencies associated with the altitude holes $l_1$ to $l_5$ respectively. In accordance with the invention, the frequency spectrum is scanned to detect those frequencies at which there is an abrupt drop in power.

The following identities define the relationships illustrated in FIG. 1:

$$F = \frac{f_m}{\sin(A_o - c)} \quad (1)$$
$$h = l_o \cos A_o \quad (2)$$
$$W_{m/2} = l_o/m \quad (3)$$

where $F$ is the Doppler shift associated with the aircraft forward velocity $V$ and is equal to $2V/W_c$ $n$ is the order of arbitrarily selected altitude hole $l$; and $W_c$ is the wavelength of the carrier frequency $f_c$ $m = n-2, n-1, n+1, n+2$ $o = 1, 2, 3, 4, 5$.

The description proceeds on the assumptions of a climb angle $c=o$ and a flat and horizontal ground for the following reasons:

To take into account aircraft climb or descent, it would merely be necessary to generate one equation more (as compared to the procedure which will be described below) and to then detect one more altitude hole to provide the data by means of which the equations could be solved. However, the principle remains unchanged.

With respect to the flat reflecting surface assumption, it can be seen that this assumption will not introduce serious errors because:

1. The error that results is an instantaneous error that would tend to average with distance, so that over a great distance the error would become negligible;

2. The error is, in any case, negligible at high altitudes;

3. There is no error over water; and

4. The error can be minimized by decreasing the wavelength of the modulating signal.

With the above noted assumptions, and taking into account the above noted definitions, the following equations can be derived from Equations 1 to 3 above:

$$f = 2V/W_c(\sin A_o) \quad 4$$
$$h = l_o \cos A_o \quad 5$$
$$l_o = mW_{m/2} \quad 6$$
$$\sin A_o = \sqrt{\frac{l_o^2 - h^2}{l_o^2}} \quad (7)$$

These equations can be combined to give:

$$(16V^{22})/(W_m^2) = (4V^2 - f_m^2 W_c^2)m^2 \quad 8$$

Equation 8 contains three unknowns, to wit, $V$, $h$ and $n(m=f(n))$. Thus by measuring the Doppler shift at three successive altitude holes, so that $m = n, n\pm1, N\pm2$, the quantities $V$, $h$ and $n$ can be solved.

However, Equation 8 can also be solved by detecting five Doppler shifts associated with five successive altitude holes and proceeding as follows: Considering each beam ($l_1$ to $l_5$ in FIG. 1) separately, the following expansions of Equation 8 are derived:

$$(16V^{22})/(W_m^2) = (4V^2 - f_1^2 W_c^2)(n-2)^2 \quad 9$$
$$(16V^2h^2)/(W_m^2) = (4V^2 - f_2^2 W_c^2)(n-1)^2 \quad 10$$
$$(16V^2h^2)/(W_m^2) = (4V^2 - f_3^2 W_c^2)(n)^2 \quad 11$$
$$(16V^2h^2)/(W_m^2) = (4V^2 - f_4^2 W_c^2)(n+1)^2 \quad 12$$
$$(16V^2h^2)/(W_m^2) = (4V^2 - f_5^2 W_c^2)(n+2)^2 \quad 13$$

Subtracting 12 from 10

$$(4V^2 - f_4^2 W_c^2)(n+1)^2 = (4V^2 - f_2^2 W_c^2)(n-1)^2 \quad 14$$
$$-16nV^2 - f_4^2 W_c^2(n+1)^2 + f_2^2 W_c^2(n-1)^2 = 0 \quad 15$$

Similarly subtracting 9 from 13

$$-32nV^2 - f_5^2 W_c^2(n+2)^2 + f_1^2 W_c^2(n-2)^2 = 0 \quad 16$$

Multiplying 15 by 2 and subtracting from 16 yields $$f_1^2 W_c^2(n-2)^2 - f_5^2 W_c^2(n+2)^2 + 2[f_4^2 W_c^2(n+1)^2 - f_2^2 W_c^2(n-1)^2] = 0 \quad 17$$

Dividing 17 by $W_c^2$ and expanding and rearranging terms gives the following result:

$$(f_1^2 - f_5^2 + 2f_4^2 - 2f_2^2)n^2$$
$$+ (-4f_1^2 - 4f_5^2 + 4f_4^2 + 4f_2^2)n$$
$$+ (4f_1^2 - 4f_5^2 + 2f_4^2 - 2f_2^2) = 0 \quad 18$$

As can be seen, this is a quadratic equation with coefficients:

$$\left.\begin{array}{l} A = f_1^2 - f_5^2 + 2f_4^2 - 2f_2^2 \\ B = 4f_1^2 - 4f_5^2 + 4f_4^2 + 4f_2^2 \\ C = 4f_1^2 - 4f_5^2 + 2f_4^2 - 2f_2^2 \end{array}\right\} \quad 19$$

To solve for $n$, it is merely necessary to solve the equation:

$$n = (-B \pm \sqrt{B^2 - 4AC})/(2A) \quad 20$$

It is noted that, by definition, $n$ must always be a positive integer. In order to ensure that $n$ is positive, it can be shown that only the positive value of the quantity under the square root sign must be used. Again, in real life, due to errors in measurement of the Doppler shifts, and due to inaccuracies in calculating devices, $n$ may not work out to be an exact integer. In this case, the closest integer to the calculated value is taken as the value of $n$. Thus, Equation 20 can be reduced to $$n = (-B + \sqrt{B^2 - 4AC})/(2A) \quad 21$$

From Equations 19, 20, and 21, it can be seen that, in order to solve for $n$, it is merely necessary to detect the Doppler shifts associated with five successive altitude holes, and then to substitute four of these values (all but $f_3$) into Equations 19, 20 and 21. A system for detecting the Doppler shifts associated with altitude holes will be described below. Computing mechanisms for solving the equation (add, subtract, multiply and divide circuits) and their method of operation and interconnection are well known in the art and will not be described herein.

By further manipulation of the above equations, it can be shown that $$V = \frac{W_m}{4} \sqrt{\frac{f_4^2(n+1)^2 - f_2^2(n-1)^2}{n}} \quad (22)$$

$$h = \frac{W_m}{2} \sqrt{\left(1 - \frac{f_2^2 W_c^2}{4V^2}\right)(n+1)^2} \quad (23)$$

As all quantities in 22 and 23 are either known or calculated, it can be seen that the flight parameters $V$ and $h$ can be derived when the Doppler shift associated with five successive altitude holes are detected.

Although only one mathematical approach has been attached above, it will be quite obvious to one skilled in the art that other approaches could be used while still within the principle of the invention, i.e., to detect a number of Doppler shifts associated with altitude holes and to use this data to solve a group of simultaneous equations.

Figure 3:
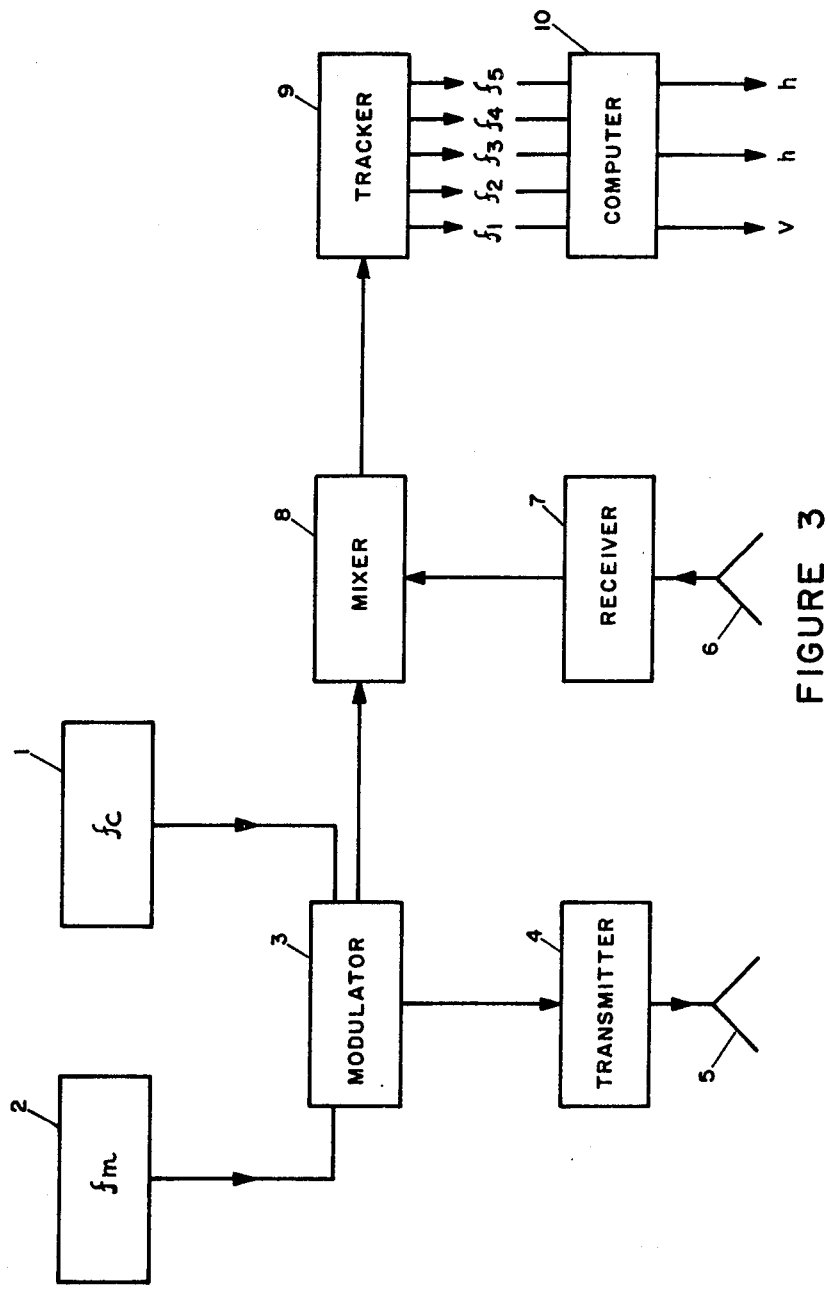
FIG. 3 illustrates a basic block diagram of a system in accordance with the invention.

A system for detecting Doppler shifts associated with altitude holes is illustrated in FIG. 3. In FIG. 3, the transmitting portion of the system consists of a carrier frequency generator 1 and a modulating frequency generator 2. The modulating frequency signal frequency modulates the carrier in a modulator 3, one output of which is fed to a transmitter 4. The transmitter output drives an antenna 5 which launches the RF wave as is well known in the art.

A reflected signal is detected by the receive antenna 6 and fed to the receiver 7, which could comprise an RF amplifier stage. The output of the receiver is fed to a mixer 8, whose other input is supplied from the modulator 3. The output of the mixer is the Doppler shift superimposed on the carrier frequency due to the velocity of the aircraft.

As will be apparent to one skilled in the art, the above-described system contains only the barest essentials. In practice, many additions will have to be made to provide an operating system. However, these are well known in the art and need not be discussed further in this specification. The above description was included to indicate how, in general terms, the Doppler shift would be obtained in an FM/CW system.

The output of the mixer 8 is fed to a tracker 9 whose function it is to search for altitude holes and to detect the Doppler shift associated with the altitude holes. The frequency of the Doppler shift is then fed to a computer 10 which, in accordance with the above or similarly suitable equations, calculates the aircraft parameters $V$, $h$ and $n$.

Figure 4:
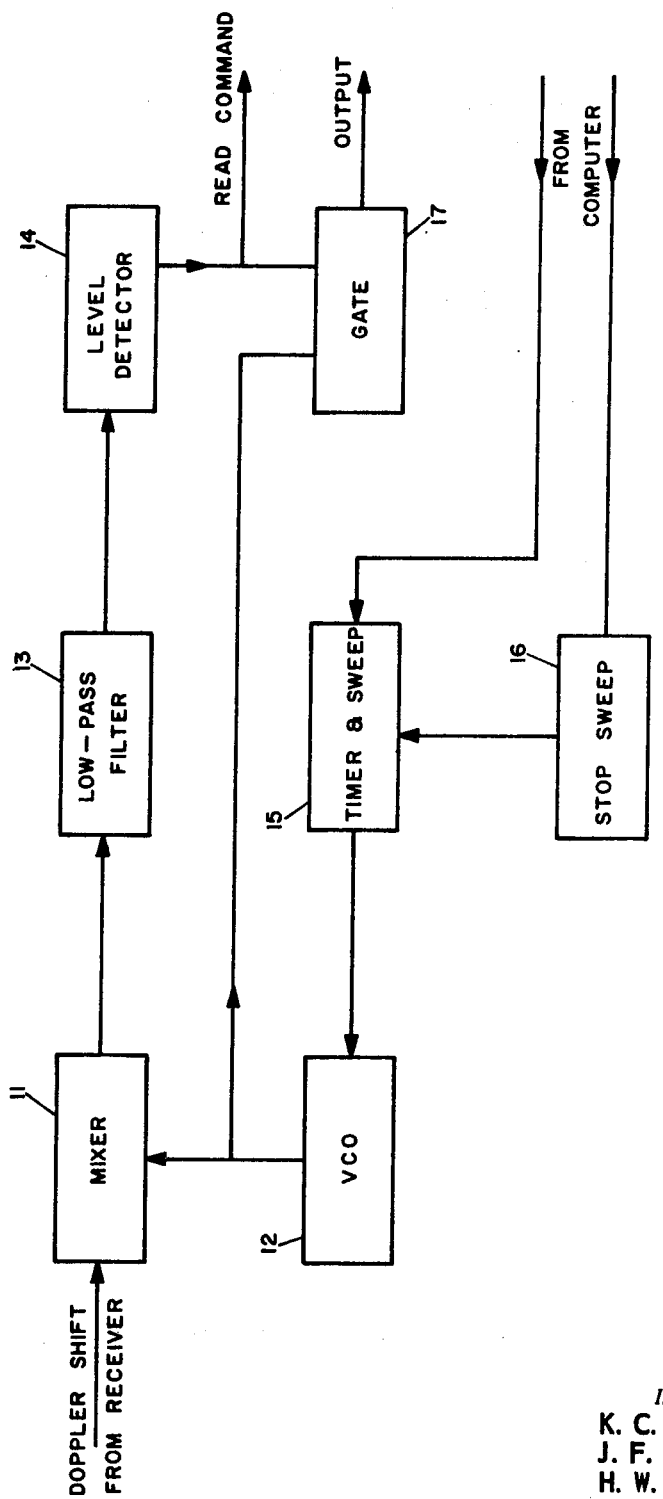
FIG. 4 illustrates a tracker in accordance with the invention.

An example of a tracker unit in accordance with the invention is illustrated in FIG. 4. Doppler shift from the receiver is fed at one input to a mixer 11 whose other input is fed from a voltage controlled oscillator 12. The VCO provides an instantaneous sweep of the appropriate frequency range (audio) and the low pass filter 13 passes essentially only a DC input. The level detector 14 monitors the energy level at the output of the filter. When the energy level is zero, the level detector provides a READ command to a computer whereupon the computer instructs the STOP SWEEP 16 to stop sweeping. At the same time, a reading of the frequency at which the zero energy level signal appeared will be read out through gate 17. When the frequency has been read, the computer will instruct the TIMER and SWEEP 15 to start a new sweep beginning at the last detected frequency and continuing upward in frequency. After five successive frequencies have been detected, the computer will instruct the TIMER and SWEEP to start sweeping from zero frequency again.

Although a particular tracker has been described in the foregoing, it will of course be clear to one skilled in the art that other systems may be used in accordance with the invention to detect attitude holes and the Doppler shifts associated with them. The particular system described was presented for the purpose of illustrating, but not limiting, the invention, and various modifications which come readily to the mind of one skilled in the art are considered to be within the scope of the invention as defined in the appended claims.

We claim:

1. An FM/CW airborne radar system comprising; transmitter means for launching a frequency modulated CW wave; receiver means for receiving reflected portions of said FM/CW wave; said receiver means comprising means for deriving Doppler shifts superimposed upon said reflected portions of said FM/CW wave; means for monitoring the energy level of said Dopler shifts and for detecting zero energy levels and the Doppler shifts associated therewith.

2. An FM/CW airborne radar system as defined in claim 1 and further comprising computer means for calculating aircraft flight parameters utilizing said detected Doppler shifts.

3. An FM/CW airborne radar system as defined in claim 2 wherein said means for monitoring the energy level of said Doppler shifts and for detecting the Doppler shifts associated therewith comprises; a first mixer means having two input terminals and an output terminal; a low pass filter having an input terminal and an output terminal; energy level detector means having an input terminal and an output terminal; a voltage controlled oscillator having a control terminal and an output terminal; TIMER and SWEEP means having a start control terminal, a stop control terminal and an output terminal; and gate means having two input terminals and an output terminal; said Doppler shifts being fed to one input terminal of said first mixer means; the output terminal of said voltage controlled oscillator being fed to the other input terminal of said first mixer means; the output terminal of said first mixer means being connected to the input terminal of said lowpass filter; the output terminal of said low pass filter being connected to the input terminal of said energy level detector means; the output terminal of said energy level detector means being connected to one input terminal of said gate means and to an input terminal of said computer means; the other input terminal of said gate means being connected to the output terminal of said voltage controlled oscillator; the control terminal of said voltage controlled oscillator being connected to the output terminal of said TIMER and SWEEP means; the start control terminal of said TIMER and SWEEP means being connected to one output terminal of said computer; the stop control terminal of said TIMER AND SWEEP means being connected to another output terminal of said computer; whereby, when a zero level is detected by said energy level detector means, the Doppler shift associated therewith is fed to said computer through said gate.

4. An FM/CW airborne radar system as defined in claim 3 wherein said transmitter means comprises a frequency modulator means having an output terminal; and wherein said receiver means comprises an RF portion having an output terminal and a second mixer means having two input terminals and an output terminal; the output terminal of said modulator means being connected to one input terminal of said second mixer means, the output terminal of said RF portion being connected to the other input terminal of said second mixer means; whereby Doppler shifts will be provided at the output terminal of said second mixer means; the output terminal of said second mixer means being connected to said one input terminal of said first mixer means.

* * * * *